E. W. BEACH.
PROCESS FOR CENTRIFUGAL SEPARATION.
APPLICATION FILED JAN. 31, 1921.
1,373,219.
Patented Mar. 29, 1921.
2 SHEETS—SHEET 1.
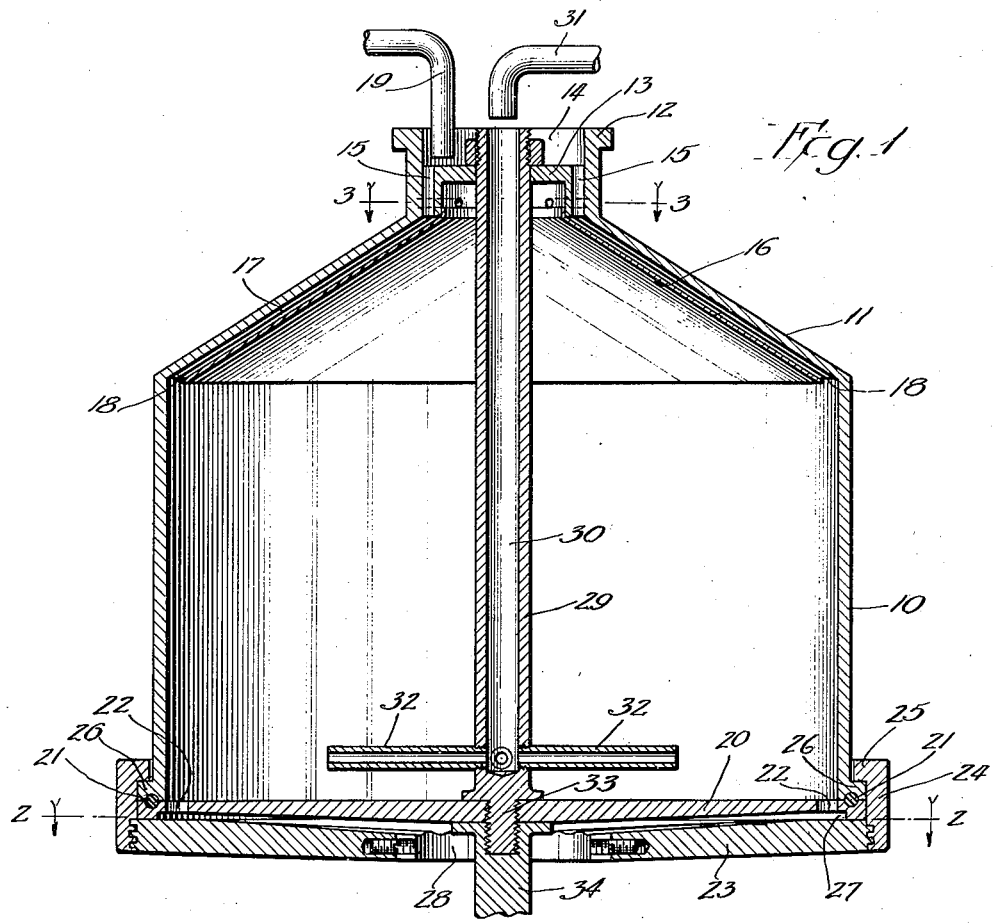
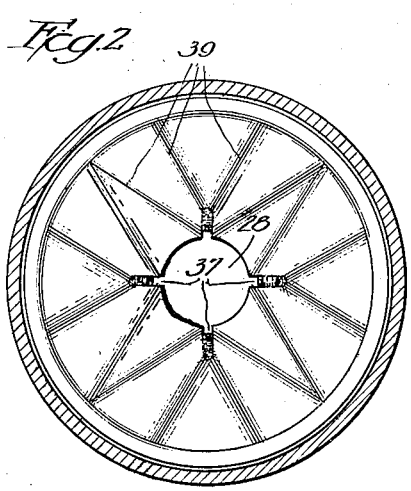
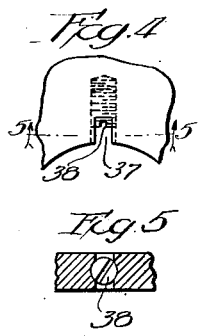
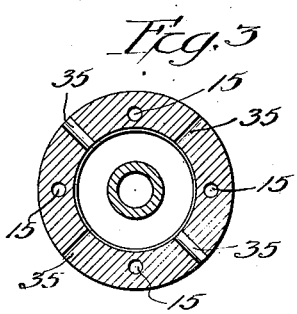
Inventor;
Edward W. Beach E. W. BEACH.
PROCESS FOR CENTRIFUGAL SEPARATION.
APPLICATION FILED JAN. 31, 1921.
1,373,219.
Patented Mar. 29, 1921.
2 SHEETS—SHEET 2.
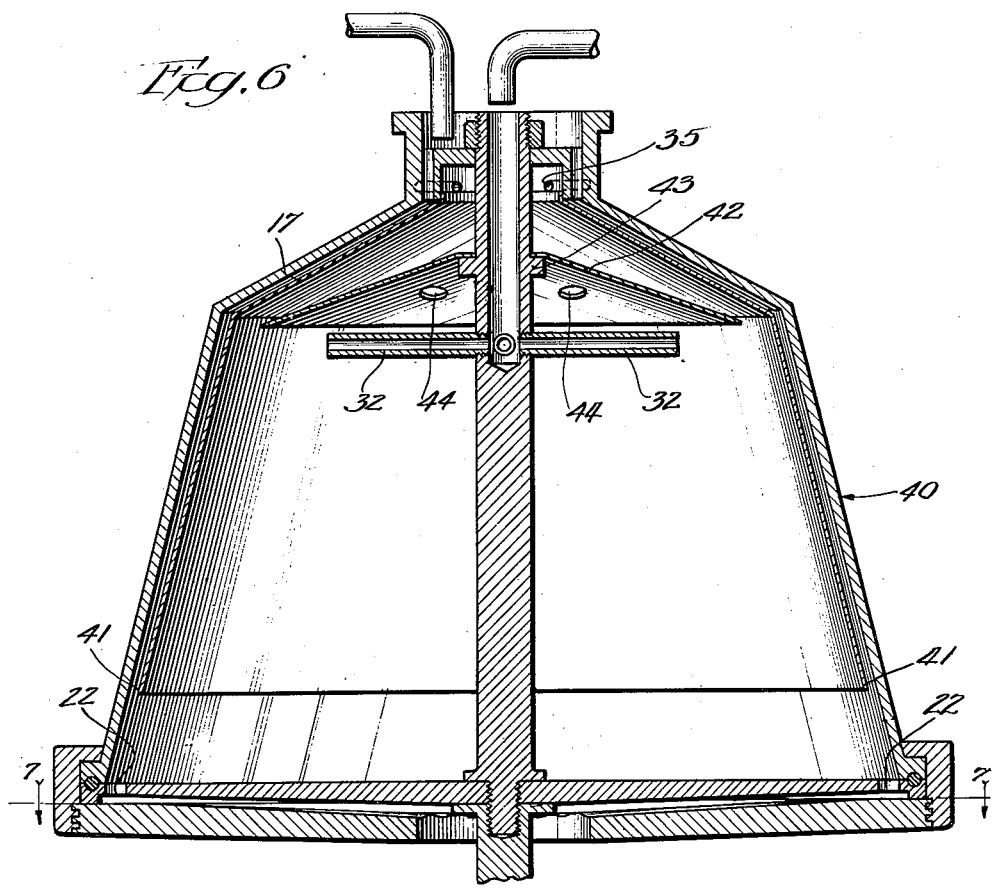
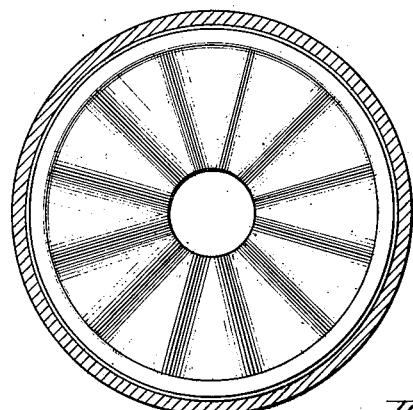
Inventor:
Edward W. Beach
Attys

UNITED STATES PATENT OFFICE.

EDWARD W. BEACH, OF WINNETKA, ILLINOIS.

PROCESS FOR CENTRIFUGAL SEPARATION.

1,373,219. Specification of Letters Patent. Patented Mar. 29, 1921.

Application filed January 31, 1921. Serial No. 441,163.

*To all whom it may concern:*

Be it known that I, EDWARD W. BEACH, a citizen of the United States, residing at Winnetka, in the county of Cook and State of Illinois, have invented new and useful Improvements in Processes for Centrifugal Separation, of which the following is a specification.

The present invention has to do with certain improvements in centrifugal separation processes and the apparatus whereby said processes may be practised. I will first explain briefly certain of the objects sought to be accomplished by the practise of the process of the present invention and will then explain more fully the process itself and the apparatus which I have herein disclosed by way of illustration for practising said process.

The process of the present invention may be used among other things for the separation of solids from liquids wherein the solids are of greater specific gravity than the liquids; for separation of liquids of one specific gravity from liquids of another specific gravity; and for the separation of solids and liquids from other liquids wherein the solids and the first mentioned liquids are both of greater specific gravity than the liquids from which they are separated. The foregoing are mentioned as illustrative of certain applications of the processes of the present invention, and are not intended as a limitation of either of the application or the usefulness of said process.

To carry the illustration of applications of the process further, I may mention as practical illustrations, and by way of illustration only, the following: Crude petroleum generally carries a percentage of sand and other foreign matter such as bottom stock of higher specific gravity than itself, and it is very desirable to remove all of said foreign matter. The process of the present invention is admirably well adapted for effecting such removal. Some cotton-seed oil contains foreign matter known in the trade as "foots," which is of higher specific gravity than the clarified oil, and the present process is well adapted for clarifying the oil by removing the said foreign matter.

In order to obtain the greatest possible daily capacity of the separating mechanism it is necessary that the process should be such as may be continuously practised without having to stop the machine from time to time in order to remove foreign matter and otherwise clean it. That is to say, it is desirable that the process should be a continuous process instead of an intermittent one. The present invention is such that the apparatus may be easily used for the continuous practice of the process.

It is also desirable that the process and apparatus should be capable of operation at a very high degree of separting efficiency, so as to insure the most perfect degree of separation possible. This result also may be secured by the use of the present process and apparatus.

According to the process of the present invention I make use of a centrifugal machine having a revolving bowl with a discharge opening at the point of larger radius, through which opening the heavier constituent is ultimately discharged from the machine. In the ordinary operation of such a machine, a greater or less percentage of the relatively lighter constituent would also find its way through this opening, so that the separation would be relatively imperfect and a portion of the lighter constituent would not be separated from the heavier one. According to the process of my present invention, I furthermore establish a closure for said opening by the use of a foreign liquid of greater specific gravity than the lighter constituent which it is sought to separate, and I control the delivery of said foreign liquid into the machine in such quantity and in such manner that there will always exist a sufficient depth of said foreign liquid against the wall of the machine to fully seal the opening aforesaid. Such lighter separated constituent will necessarily be confined inside the vertical level of such foreign liquid column and by reason of the difference in specific gravity the lighter separated constituent can not pass through the heavier foreign liquid and escape through the opening aforesaid.

In this connection, furthermore, I select a foreign liquid which has a specific gravity lower than or equal to the heavier constituent which is to be separated from the lighter constituent, so that said heavier constituent will naturally force its way into or mingle with said foreign liquid and be delivered by it through the opening aforesaid and carried to a suitable discharge point.

It is thus evident that in the practice of the present process I make use of a foreign liquid having a specific gravity equal to or lighter than the heavier constituent which is to be separated, so that the lighter of the constituents are held back by said foreign liquid, while the heavier constituent works into or intermingles with the foreign liuqid, and the foreign liquid furthermore being used in sufficient quantity and in proper manner to seal the lighter constituent against loss or discharge through the opening through which the heavier constituent is to pass.

As a further feature of my process I preferably cause the foreign liquid to flow through the machine in sufficient quantity and with consequent velocity to carry with it the heavier constituent, so that it continuously washes said heavier constituent out of the machine thus making the process a continuous one and with the attendant benefits and advantages.

In the drawings I have illustrated certain forms of apparatus which may be operated according to the process of the present invention, and which forms of apparatus embody the features of the present invention. I wish it understood, however, that the forms of apparatus illustrated in the drawings are given merely by way of illustration and not by way of limitation and that as far as the process is concerned, it may be practised in many other forms of apparatus than those illustrated in the drawings; and as far as the apparatus features of the invention are concerned, many other forms of apparatus may be devised which will nevertheless embody the features of the present invention.

Bearing the foregoing in mind:

Figure 1 shows a vertical section through one form of apparatus embodying the features of the present invention;

Fig. 2 shows a section taken on the line 2—2 of Fig. 1, looking in the direction of he arrows, but on reduced scale;

Fig. 3 shows a section taken on the line 3—3 of Fig. 1, looking in the direction of the arrows;

Fig. 4 shows a fragmentary face view of one of the control slots shown in Fig. 2, but on enlarged scale;

Fig. 5 is a fragmentary section taken on the line 5—5 of Fig. 4, looking in the direction of the arrows;

Fig. 6 shows a vertical section through a modified form of machine embodying the features of the present invention; and Fig. 7 shows a horizontal section taken on the line 7—7 of Fig. 6, looking in the direction of the arrows.

In the apparatus shown in Fig. 1, there is provided a bowl 10, the upper portion of which converges inwardly as at 11 and terminates in an upstanding flange 12. A floor 13 is provided within said flange, serving to establish an annular depression or recess 14. One or more vertical passages 15 are located at the outer portion of this recess and serve to permit the liquid, delivered into the recess, to find its way into the bowl.

A cone shaped flange 16 is located beneath the tapering upper portion 11 of the bowl, the upper end of said flange 16 being secured to the upper portion of the bowl, and said flange 16 establishing a cone shaped annular passage 17 whose upper end receives liquid from the passages 15 and whose lower end serves to discharge said liquid into the bowl proper at the point 18 adjacent to the upper edge of the vertical portion of the bowl. A pipe 19 is provided for delivering liquid into the depressed portion 14 so that it can find its way down through the passages 15 and through the annular passage 17 to the point 18.

The lower portion of the bowl proper is closed by a plate 20 which sets against the lower edge of the bowl and a liquid tight connection is established at this point by a gasket 21 if necessary. A series of openings 22 are provided in the plate 20 adjacent to the periphery of the bowl so that material lying close to the periphery of the bowl may find its way through the passages 22 and out of the bowl proper.

A plate 23 is located beneath the plate 20, said plate 23 being clamped in place by a shouldered collar 24, the shoulder 25 of which engages a flange 26 on the lower edge of the bowl proper. The collar 24 when clamped up by threading onto the plate 23 serves to draw all of the parts tightly together, but an annular space 27 is established between the plates 20 and 23. This annular space 27 communicates with an interior discharge opening 28 in the center portion of the plate 23.

Extending vertically through the bowl is a hollow shaft 29 having a bore 30, the upper end of said bore receiving material through the pipe 31. The lower end of said bore 30 communicates with a series of horizontally extending hollow arms 32 which reach radially into the separating zone of the bowl proper at a point somewhat above the plate 20 where they discharge material descending through the bore 30. A convenient mechanical construction is that illustrated in the drawing, in which the stem 29 has its lower end 33 threaded into the plate 20 and into the drive shaft 34. The upper end of the spindle 29 extends through the floor 13 to receive the materials from the pipe 31.

One or more radial passages 35 are provided in the upper portion of the bowl at points intermediate the vertical passages 15, the passages 35 being intended for the delivery of lighter constituent from the upper portion of the bowl.

The discharge surface of the opening 28 is located in such relation to the passages 15 and discharge passage 35 as to cause a natural flow of the heavier material and foreign liquid to and through the opening 28.

The effective discharge surface of the opening 28 may be adjusted in the following manner: One or more slots 37 are formed in the periphery of the opening 28 so that the outer faces of said slots lie at a greater distance from the center of rotation than does the surface of the opening 28 proper. A threaded plug 38 is provided in each of the slots 37 so that said plug may be moved in or out in order to thereby vary the effective discharge radius of the slots. In this manner, the effective discharge radius may be adjusted in order to get the desired result, bearing in mind the specific gravities of the various constituents to be separated and also the manner in which the machine is being used.

The apparatus so far described may be used in the following manner: The machine is first brought into rapid rotation so that any material introduced into the bowl will be subjected to centrifugal force. There is then introduced through the passages 15 foreign liquid in sufficient quantity to completely seal the openings 22 by assuming a vertical position against the outer wall of the bowl. Thereafter, the mixture whose constituents are to be separated is introduced through the passage 30, filling the remaining portion of the bowl and commencing the centrifugal separating action. The material to be subjected to separation is introduced through the passage 30 in a more or less continuous fashion, the matter of higher specific gravity penetrating into or mingling with the foreign liquid column and the material of lower specific gravity being forced inwardly and discharged through the passages 35. By continuously introducing the foreign liquid through the passages 15, the operation of the machine will be maintained in continuous fashion, said foreign liquid being delivered continuously into the machine, the heavier constituent commingling therewith or entering thereinto, and the foreign liquid and said heavier constituent being discharged through the openings 22 and through the passage between the plates 20 and 23, and being discharged from the machine through the opening 28, whereas the lighter material will pass up and be discharged through the passages 35.

If the size of the passage between the plates 20 and 23 were unduly large there might take place a secondary separating action in said passage, the heavier material carried over by the foreign liquid being thrown out to the point of greatest radius, and the foreign liquid itself being discharged through the opening 28 without said heavy material. By so proportioning the size of the passage between the plates 20 and 23 as to insure a sufficiently rapid travel of material therethrough this secondary separation is prevented. Furthermore, as a matter of convenience, I have shown in Figs. 1 and 2 a construction of plate 23 having in its upper surface a series of more or less radial corrugations 39, which corrugations lead to the various discharge slots 37. In this way the movement of the foreign liquid together with the material which it carries is facilitated and the natural direction of flow is rendered easy.

It is noted that in the arrangement shown in Fig. 1 the pipes 32 are relatively short and terminate fairly close to the bottom plate 20. Since the lighter portion of the materials to be separated will of necessity have to travel upward to the discharge passages 35, it follows that the distance of such travel will be sufficient to insure the most complete possible separation.

In the arrangement shown in Figs. 6 and 7, the bowl 40 tapers in size toward its upper edge so that its lowest portion is of greatest radius. Since the foreign liquid will stand in a practically vertical position against the lower portion of the wall of the bowl, it follows that with this tapering form of bowl a sufficient thickness of foreign liquid may be secured to completely seal the opening 22 without said foreign liquid standing very high on the face of the bowl. The foreign liquid may in such case be delivered into the bowl in the same manner as previously explained in connection with the arrangement of Fig. 1. Or the annular passage 17 may be extended down to the point 41 or thereabouts so as to deliver the foreign liquid directly to the sealing column; but in either case the foreign liquid will seal the openings 22. It is also observed that in the arrangement in Fig. 6 I have illustrated a flange 42 in the upper portion of the bowl and resting upon a shoulder 43. This flange is provided with a series of openings 44 which permit the lighter material to move upward to the discharge passages 35. I have also shown in Fig. 6 the pipes 32 as being located well up in the body of the bowl and beneath the flange 42, since said flange 42 will insure a proper separating action and sufficiently interfere with the movement of the materials to prevent a too direct travel toward the passages 35.

As a matter of convenience, I have herein designated the foreign liquid as a carrier or sealing liquid, but these terms are used only as a matter of simplification in description. Furthermore, it will be understood that in some cases two or more lighter materials may be separated from two or more heavier materials of a mixture by selecting a foreign liquid having a specific gravity intermediate between the specific gravities of the lighter and heavier groups, or at any rate of specific gravity greater than the lighter group and not greater than the heavier group, and such groups are herein referred to as lighter and heavier constituents.

I claim:

1. The process for the separation of a heavier solid constituent from a lighter fluid constituent of a mixture containing both of said constituents, which process consists in subjecting said mixture to centrifugal action within a centrifugal machine having a discharge passage adjacent to its outer wall, and having another discharge passage relatively close to its center of rotation, which further consists in introducing into said machine a fluid sealing and carrying material having a specific gravity intermediate between the specific gravity of the heavier solid constituent and the lighter fluid constituent, said fluid sealing and carrying material being introduced in sufficient amount to create against the outer wall of the centrifugal machine a layer of said sealing and carrying material of sufficient thickness to fully close the discharge passage, which is adjacent to the outer wall, and thereby prevent the movement of lighter separated constituent through said passage, and whereby the heavier solid constituent is enabled to penetrate said sealing and carrying liquid on account of its higher specific gravity, and be removed with said liquid, substantially as described.

2. The process for the separation of a heavier solid constituent from a lighter fluid constituent of a mixture containing both of said constituents, which process consists in subjecting the said mixture to centrifugal action within a centrifugal machine having a discharge passage adjacent to its outer wall, and having another discharge passage relatively close to its center of rotation, and having a conduit leading from said first mentioned discharge passage to a point relatively close to the center of rotation but farther removed from the center of rotation than said second mentioned discharge passage, which further consists in introducing into said machine a fluid sealing and carrying material having a specific gravity intermediate between the specific gravity of the heavier solid constituent and the lighter fluid constituent, said fluid sealing and carrying material being introduced in sufficient amount to create against the outer wall of the centrifugal machine a layer of said sealing and carrying material of sufficient thickness to fully close the discharge passage, which is adjacent to the outer wall, and thereby prevent the movement of lighter separated constituent through said passage, said fluid sealing and carrying material being introduced in sufficient volume to create a velocity of flow through said conduit sufficiently rapid to prevent secondary separation therein, substantially as described.

3. The process for the separation of a heavier constituent from a lighter fluid constituent of a mixture containing both of said constituents, which process consists in subjecting said mixture to centrifugal action within a centrifugal machine having a discharge passage adjacent to its outer wall and communicating with a conduit terminating at a point relatively close to the center of rotation, said machine having another discharge passage closer to the center of rotation than the discharge end of said conduit, and which further consists in continuously introducing into said machine a fluid sealing and carrying material having a specific gravity greater than the specific gravity of the lighter constituent and not greater than the specific gravity of the heavier constituent, said fluid sealing and carrying material being introduced in sufficient amount to create against the outer wall of the centrifugal machine a layer of said sealing and carrying material of sufficient thickness to fully close the first mentioned discharge passage, which is adjacent to the outer wall, and thereby prevent the movement of lighter separated constituent through said passage, substantially as described.

4. The process for the separation of a heavier constituent from a lighter fluid constituent of a mixture containing both of said constituents, which process consists in subjecting said mixture to centrifugal action within a centrifugal machine having a discharge passage adjacent to its outer wall and communicating with a conduit terminating at a point relatively close to the center of rotation, said machine having another discharge passage in vertical alinement with or closer to the center of rotation than the discharge end of said conduit, and which further consists in continuously introducing into said machine a fluid sealing and carrying material having a specific gravity greater than the specific gravity of the lighter constituent but not greater than the specific gravity of the heavier constituent, and which further consists in regulating the rate of flow and volume of introduction of said fluid sealing and carrying material, and in regulating the point of discharge of the conduit in such manner as to continuously create against the outer wall of the centrifugal machine a layer of said sealing and carrying material of any desired thickness but always of sufficient thickness to fully close the first mentioned discharge passage, which is adjacent to the outer wall, and thereby provide for a proper balance of columns to insure the proper discharge of the heavier and lighter separated constituents and also prevent the movement of lighter separated constituent through said passage, substantially as described.

5. The process for the separation of a heavier constituent from a lighter fluid constituent of a mixture containing both of said constituents, which process consists in subjecting said mixture to centrifugal action within a centrifugal machine having a discharge passage adjacent to its outer wall and having another discharge passage relatively close to its center of rotation, which further consists in introducing into said machine independently of the mixture to be separated a fluid sealing and carrying material having a specific gravity greater than the specific gravity of the lighter constituent but not greater than the specific gravity of the heavier constituent to be separated, said fluid sealing and carrying material being introduced in sufficient amount to create against the outer wall of the centrifugal machine a layer of said sealing and carrying material of sufficient thickness to fully close the discharge orifice which is adjacent to the outer wall and thereby prevent the movement of lighter separated constituent through said passage, and whereby the heavier separated constituent is enabled to mingle with or penetrate said sealing and carrying liquid on account of its specific gravity and be removed with said liquid, substantially as described.

EDWARD W. BEACH.